US012556786B1

(12) United States Patent
Xu

(10) Patent No.: US 12,556,786 B1
(45) Date of Patent: Feb. 17, 2026

(54) DETACHABLE CAMERA DEVICE

(71) Applicant: Zhihui Xu, Kaifeng (CN)

(72) Inventor: Zhihui Xu, Kaifeng (CN)

(*) Notice: Subject to any disclaimer, the term of this patent is extended or adjusted under 35 U.S.C. 154(b) by 0 days.

(21) Appl. No.: 19/286,174

(22) Filed: Jul. 30, 2025

(30) Foreign Application Priority Data

Mar. 31, 2025 (CN) .......................... 202510407710.4

(51) Int. Cl.
*H04N 23/51* (2023.01)
(52) U.S. Cl.
CPC .................................. *H04N 23/51* (2023.01)
(58) Field of Classification Search
CPC ........ H04N 23/00; H04N 23/50; H04N 23/51; G03B 17/56–561; G03B 11/04–06
See application file for complete search history.

(56) References Cited

U.S. PATENT DOCUMENTS

| | | | | |
|---|---|---|---|---|
| 2009/0091618 A1* | 4/2009 | Anderson | ................. | B60R 1/28 |
| | | | | 348/347 |
| 2009/0295985 A1* | 12/2009 | Nakamura | ............. | H04N 23/57 |
| | | | | 348/373 |
| 2016/0050399 A1* | 2/2016 | Chuter | ................... | H04N 7/186 |
| | | | | 348/155 |
| 2022/0217307 A1* | 7/2022 | Bakke | ...................... | H04N 7/18 |

* cited by examiner

*Primary Examiner* — Lin Ye
*Assistant Examiner* — Chriss S Yoder, III
(74) *Attorney, Agent, or Firm* — Li & Cai Intellectual Property Office

(57) ABSTRACT

The present invention relates to a detachable camera device, and pertains to the field of photography. It comprises a first detachable connection component, a second detachable connection component, and a camera component. The first detachable connection component is used for connection with an area where a camera is to be mounted. The first detachable connection component has a middle portion, on which a first avoidance through slot is opened. The second detachable connection component for fitting with the first detachable connection component to establish a detachable connection is arranged on the camera component.

8 Claims, 5 Drawing Sheets

DETACHABLE CAMERA DEVICE

CROSS-REFERENCE TO RELATED PATENT APPLICATION

The present disclosure claims priority to Chinese Patent Application No. 202510407710.4, entitled "Quickly Removable Camera Device", filed with the China National Intellectual Property Administration on Mar. 31, 2025, the entirety of which is incorporated herein by reference.

FIELD OF THE DISCLOSURE

The present invention relates to the field of imaging technology, specifically to a detachable camera device.

BACKGROUND OF THE DISCLOSURE

With the rapid development of the image processing technology and the network communication technology, cameras, as a key device for collecting images, have been widely used in fields such as security monitoring, smart home systems, vehicle-mounted devices, portable electronic devices, and industrial inspection. In practical applications, camera devices often require mounting, dismounting, or maintaining depending on the usage environments.

For example, at home or in an office, a user may need to change the shooting location of a camera; in industrial or outdoor scenarios, the camera needs to be overhauled or exchanged on a regular basis perhaps due to frequent use or under the influence of the external environment. However, camera devices in the prior art are usually fixed by means of screws, buckles, or the like, and when the camera needs to be mounted on glass to image the scenery on the other side of the glass, a double-sided tape is usually used to mount the camera.

Upon the completion of the fixation in the stick-on approach, an irreversible connection is formed between the camera component and the shell. If the component needs to be dismounted, repaired, or replaced, bonded parts usually need to be destroyed, which is prone to damage to the camera module or the shell, and seriously affects the subsequent use and maintenance. Therefore, there is an urgent need for a camera device that is simple in structure, convenient and fast to dismount and mount, and easy to maintain, so as to improve the user experience and the adaptability of the device.

SUMMARY OF THE DISCLOSURE

The technical problem to be solved by the present invention is put as follows: upon the completion of the fixation in the stick-on approach, an irreversible connection is formed between the camera component and the shell; if the component needs to be dismounted, repaired, or replaced, bonded parts usually need to be destroyed, which is prone to damage to the camera module or the shell, and seriously affects the subsequent use and maintenance; therefore, there is an urgent need for a camera device that is simple in structure, convenient and fast to dismount and mount, and easy to maintain, so as to improve the user experience and the adaptability of the device. To overcome the above-mentioned defects of the prior art, a detachable camera device is provided.

The technical solution adopted by the present invention to solve the technical problem concerned is to:
construct a detachable camera device, comprising:
a first detachable connection component, which is used for connection with an area where a camera is to be mounted, wherein a first avoidance through slot is formed in a middle portion of the first detachable connection component; a camera component, on which a second detachable connection component for fitting with the first detachable connection component to establish a detachable connection is arranged.

The present invention has the following beneficial effects: the present invention is arranged to have a first detachable connection component, a second detachable connection component, and a camera component, wherein the first detachable connection component has a middle portion, on which a first avoidance through slot is opened, and the second detachable connection component for fitting with the first detachable connection component to establish a detachable connection is arranged on the camera component; due to the design of the first detachable connection component and the second detachable connection component, the user can conveniently and quickly dismount and replace the camera component without professional tools or complex operation steps; the first avoidance through slot can allow a camera module to protrude, which prevents obstructing the mounting and use of the camera; the first avoidance through slot performs the alignment and guidance function, which avoids the offset problem at the time of mounting, enables the camera module to get in position accurately, and improves the consistency and reliability of the assembly.

BRIEF DESCRIPTION OF THE DRAWINGS

To make the embodiments of the present invention or the technical solutions in the prior art clearer, the present invention will be further illustrated in combination with the figures and embodiments. The figures described below only relate to some embodiments of the present invention. Based on these figures, persons skilled in the art can obtain other figures without creative labor.

REFERENCE SIGNS

Figure 1:
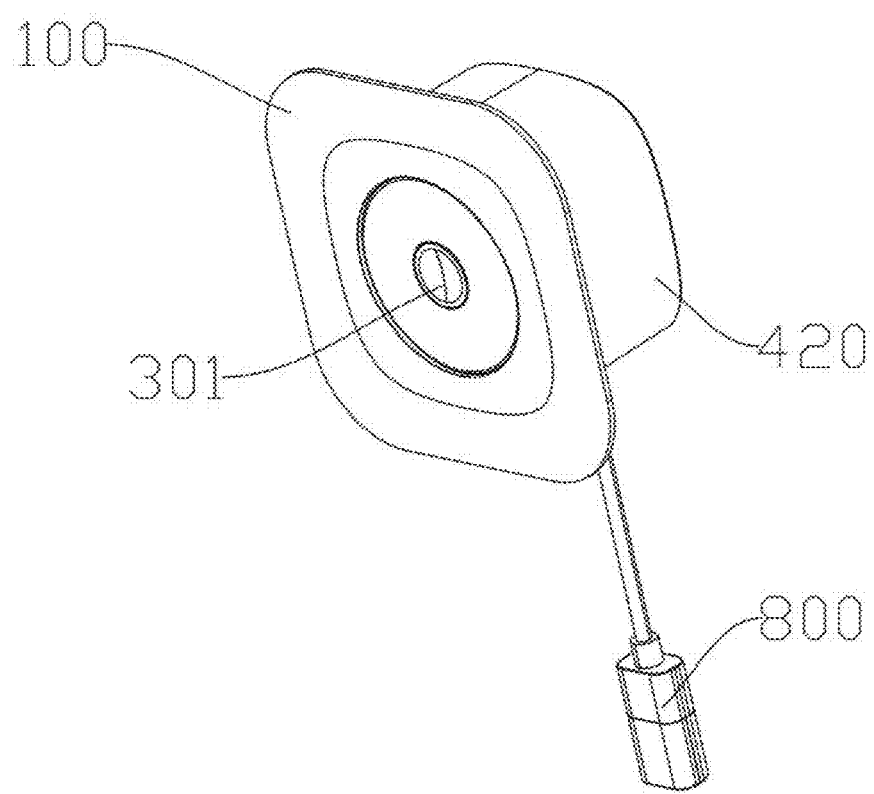
FIG. 1 is an overall axonometric diagram of the present invention in an embodiment.

100. first detachable connection component; 101. first avoidance through slot;
200. second detachable connection component;
301. camera module; 302. limit slot;
400. shell; 410. front shell; 411. second avoidance slot; 412. assembly slot; 413. mounting hole; 420. rear shell; 421. sound hole;
500. light-shielding sticker;
600. assembly connection column; 601. countersunk through-hole;
700. snap-fit slot;
800. charging cable; 810. battery; 811. indicator light; 812. microphone; 813. speaker.

DETAILED DESCRIPTION OF THE EXEMPLARY EMBODIMENTS

To make the objectives, technical solutions, and advantages of the present invention clearer, the technical solutions of the present invention will be described clearly and completely in combination with the figures in the present invention. Obviously, the described embodiments are some embodiments of the present invention, rather than all the embodiments thereof. All other embodiments obtained by persons skilled in the art on the basis of the embodiments in the present invention without creative labor fall within the scope of protection of the present invention.

In the illustration of the embodiments of the present application, it should be noted that unless otherwise specified and limited, the terms "link" and "connect" should be broadly understood. For example, they can be fixed connections, detachable connections, or integral connections; they can be mechanical connections or electrical connections; they can be direct connections or indirect connections through intermediate media. Persons skilled in the art can understand the specific meanings of the above terms in the embodiments of the present application according to specific situations.

In the embodiments of the present application, unless otherwise specified and limited, a first feature "on" or "under" a second feature can be in direct contact with the second feature, or can be in indirect contact with the second feature through an intermediate medium. Moreover, the first feature "on", "above", or "over" the second feature can mean that the first feature is directly or diagonally above the second feature, or merely indicate that the first feature is horizontally higher than the second feature. The first feature "under", "below", or "underneath" the second feature can mean that the first feature is directly or diagonally below the second feature, or merely indicate that the first feature is horizontally lower than the second feature.

In the present description, the illustration with reference to the terms "one embodiment", "some embodiments", "example", "specific example", "some examples", or the like means that the specific features, structures, materials, or characteristics described in combination with the embodiments or examples are included in at least one embodiment or example of the present application. In the present description, the schematic expressions of the above terms are not necessarily directed to the same embodiments or examples. Moreover, the specific features, structures, materials, or characteristics as described can be combined in any one or more embodiments or examples in an appropriate manner. In addition, persons skilled in the art can combine and integrate different embodiments or examples described in the present description, as well as the features in different embodiments or examples, without conflicting with each other.

Figure 2:
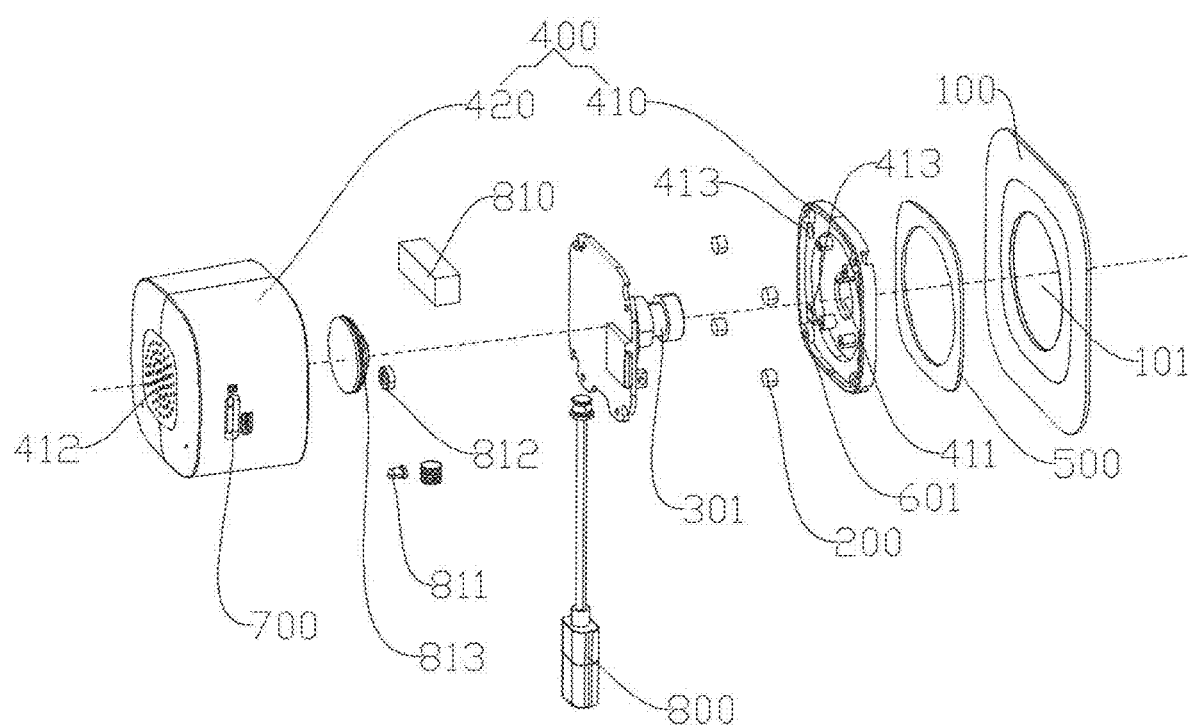
FIG. 2 is an overall exploded diagram of the present invention in an embodiment.
Figure 3:
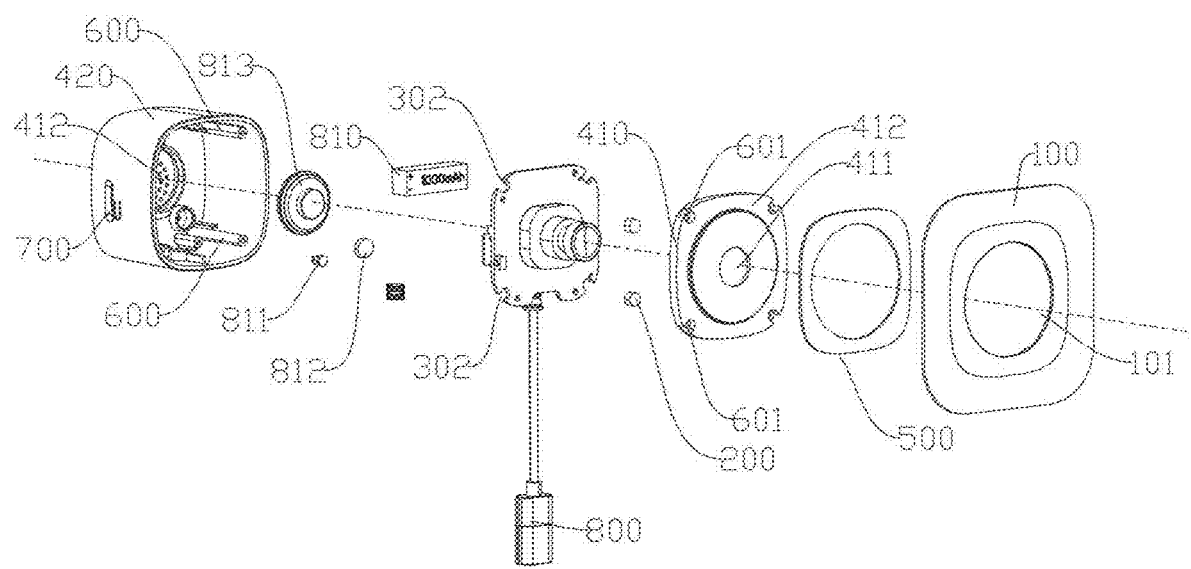
FIG. 3 is another overall exploded diagram of the present invention in an embodiment.
Figure 4:
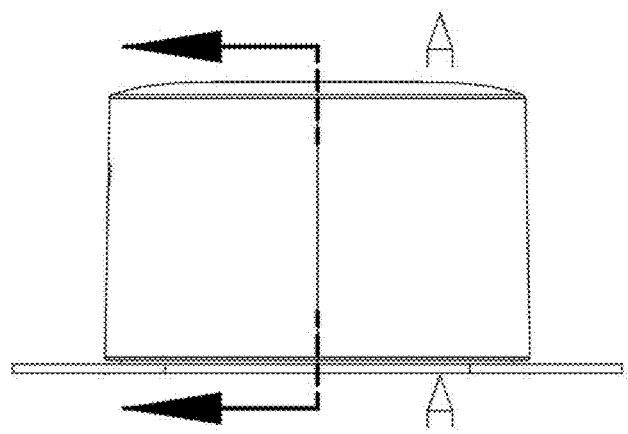
FIG. 4 is a top-view diagram of the present invention in an embodiment.
Figure 5:
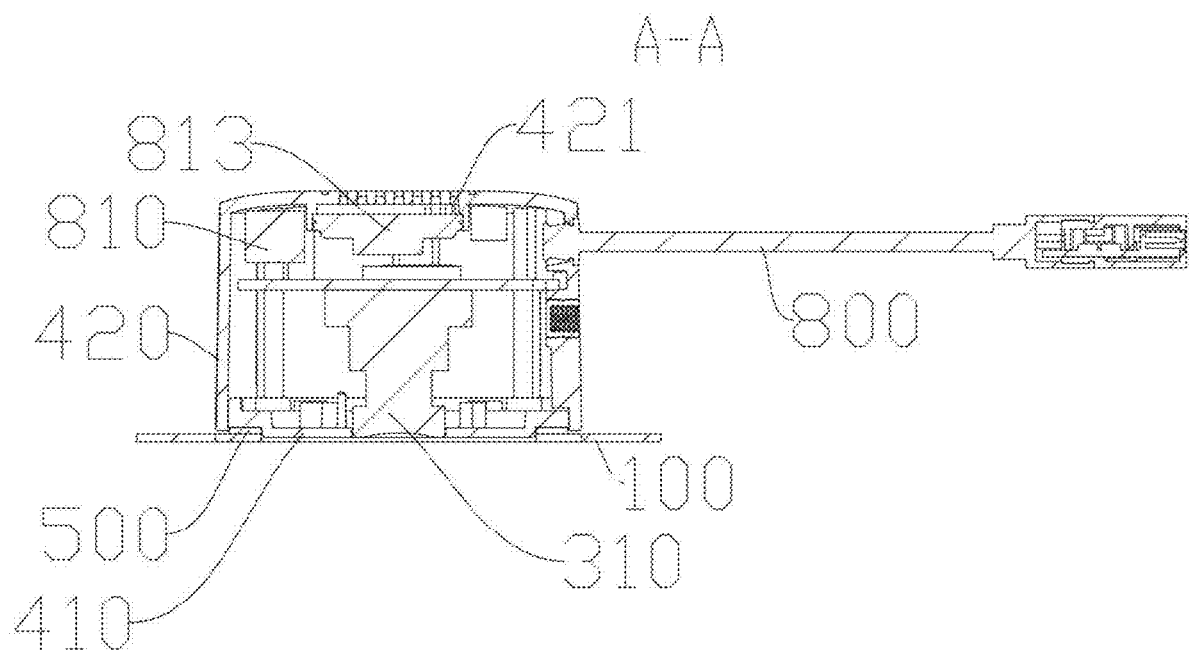
FIG. 5 is a cutaway diagram of the present invention along Line A-A in FIG. 4 in an embodiment.

As shown in FIGS. 1-5, the present invention relates to a detachable camera device, comprising a first detachable connection component 100, a second detachable connection component 200, and a camera component; the first detachable connection component 100 is used for connection with an area where a camera is to be mounted, wherein a first avoidance through slot 101 is formed in a middle portion of the first detachable connection component; the second detachable connection component 200 for fitting with the first detachable connection component 100 to establish a detachable connection is arranged on the camera component. Further, due to the design of the first detachable connection component 100 and the second detachable connection component 200, the user can conveniently and quickly dismount and replace the camera component without professional tools or complex operation steps; the first avoidance through slot can allow a camera module 301 to protrude, which prevents obstructing the mounting and use of the camera; the first avoidance through slot 101 performs the alignment and guidance function, which avoids the offset problem at the time of mounting, enables the camera module 301 to get in position accurately, and improves the consistency and reliability of the assembly.

Referring to FIGS. 1-5, in the present embodiment, the camera device comprises a shell 400 and the camera module 301 arranged inside the shell 400; the shell 400 comprises a rear shell 420 and a front shell 410 that is in detachable connection with the rear shell 420. Further, when the device malfunctions or the user needs to upgrade the camera module, there is no need to replace the entire device; instead, only the shell 400 needs to be disassembled, and the internal module needs to be replaced, which improves the maintainability and upgradability of the device and prolongs the service life of the product.

Referring to FIGS. 1-5, in the present embodiment, a second avoidance slot 411 corresponding to the first avoidance through slot is arranged on one end of the front shell 410; an assembly slot 412 is arranged on one end of the front shell 410, which end is distal from the rear shell 420; the camera module 301 has one end that is threaded through the first avoidance through slot and the second avoidance slot 411; a light-shielding sticker 500 is arranged in the assembly slot 412. Further, as one end of the camera module 301 is threaded through the first avoidance through slot and the second avoidance slot 411, it is convenient to use the camera module 301; by arranging the light-shielding sticker 500 in the assembly slot 412, external stray light can be effectively blocked from entering the imaging area of the camera module 301, which reduces the interference from ambient light and enhances the image clarity and image quality of the camera.

Referring to FIGS. 1-5, in the present embodiment, a snap-fit slot 700 is arranged on one side of the shell 400, and a snap-fit block for snap-fit connection with the snap-fit slot 700 is arranged on the camera module 301. Further, by arranging the snap-fit slot 700 on one side of the shell 400 and arranging the snap-fit member that fits with the snap-fit slot 700 on the camera module 301, the camera module 301 can be reliably fixed to the shell 400 through the snap-fit connection.

Referring to FIGS. 1-5, in the present embodiment, the first detachable connection component 100 is a magnetic sticker; a bonding layer for bonding to the area where a camera is to be mounted is arranged on one end of the magnetic sticker, which end is distal from the shell; the second detachable connection component 200 is a magnetic block that is arranged on one end of the front shell 410, which end is proximal to the rear shell 420. Specifically, four mounting holes 413 are uniformly arranged on one end of the front shell 410, which end is proximal to the rear shell 420, and the magnetic blocks are arranged in the mounting holes 413. Further, as the bonding layer is arranged on one end of the magnetic sticker, the magnetic sticker can be firmly bonded to the area where a camera is to be mounted, so as to ensure the stability of the connection area. In the present embodiment, the area where a camera is to be mounted can be a wall, glass, etc. Since the first detachable connection component 100 is a magnetic sticker and the second detachable connection component 200 is a magnetic block that is arranged on one end of the front shell 410, which end is proximal to the rear shell 420, the magnetic attraction force can be used to realize quick assembly and disassembly between the front shell 410 and the rear shell 420, which avoids the problems of complex structure and inconvenient disassembly and assembly in the traditional connection manners such as screws and buckles, and significantly improves the assembly efficiency and the convenience in use.

Referring to FIGS. 1-5, further, by uniformly arranging four mounting holes 413 at one end of the front shell 410, which end is proximal to the rear shell 420, and embedding the magnetic blocks in the mounting holes 413, a more balanced distribution of the attraction force can be achieved while hiding the magnetic blocks, which enhances the stability and firmness of connection points of the shell 400, and effectively prevents the local loosening or deformation of the shell 400 as caused by the uneven magnetic force.

Referring to FIGS. 1-5, in the present embodiment, at least two assembly connection columns 600 are arranged opposed to each other inside the shell 400, and limit slots 302 that fit with the assembly connection columns 600 to carry out limiting are arranged on a side wall of the camera module 301. In the present embodiment, there are four assembly connection columns 600 and four limit slots 302 that correspond to each other. Further, by arranging at least two assembly connection columns 600, preferably four, in relative distribution inside the shell 400, and arranging limit slots 302 on the side wall of the camera module 301 to fit therewith, the multi-point limit fixation of the camera module 301 inside the shell 400 is realized, which effectively improves the stability and positioning accuracy of the assembly, and avoids the problems such as shaking and displacement of the camera module 301 during the assembly or use.

Referring to FIGS. 1-5, in the present embodiment, countersunk through-holes 601 corresponding to the assembly connection columns 600 are arranged on the front shell 410, which can be connected to the assembly connection columns 600 as connecting members pass through the countersunk through-holes 601. In the present embodiment, the connecting members are screws, and the assembly connection columns 600 are internally threaded columns; by arranging the countersunk through-holes 601 that correspond to the assembly connection column 600 on the front shell 410, the screws can be firmly connected to the internally threaded columns after passing through the countersunk through-holes 601, which further enhances the assembly stability between the camera module 301 and the shell 400, and prevents the components from loosening, displacement or falling off during use; by arranging the countersunk through-holes 601, the heads of the connecting members can be embedded below the surface of front shell 410 after the assembly, which maintains the flatness of the outer surface of front shell 410, avoids affecting the appearance or scratching the user due to protruding screws, and improves the overall aesthetic appeal and safety of the product. In some embodiments, the connecting members can also be plug-in members, and plug-in holes that correspond to the plug-in members are arranged on middle portions of the assembly connection columns 600.

Referring to FIGS. 1-5, in the present embodiment, any one or more of a battery 810, an indicator light 811, a microphone 812, and a speaker 813 are mounted inside the shell 400, and a charging cable 800 that is electrically connected to the camera module 301 is arranged on a bottom portion of the shell 400. Further, by integrating one or more functional components among the battery 810, the indicator light 811, the microphone 812, and the speaker 813 inside the shell 400, the camera device has multiple functions such as power supply, prompt, sound pickup, and voice playback, thereby expanding the application range of the device and meeting diverse usage needs. By arranging the charging cable 800 that is electrically connected to the camera module 301 on the bottom portion of the shell 400, the device can be charged via the cable or connected to an external power source for power supply.

Referring to FIGS. 1-5, in the present embodiment, sound holes 421 are arranged on one end of the rear shell 420, which end is distal from the front shell 410. Further, the arrangement of the sound holes 421 on one end of the rear shell 420, which end is distal from the front shell 410, facilitates effectively sending sound out of audio components such as the speaker 813 therein, which ensures the propagation effect of voice playback or prompt sound, and enhances the interaction experience of the user.

It should be understood that persons skilled in the art can make improvements or transformations according to the above illustration, and all these improvements and transformations should fall within the scope of protection of the claims attached to the present invention.

What is claimed is:

1. A detachable camera device, comprising:
    a first detachable connection component (100), which is used for connection with an area where a camera is to be mounted, wherein a first avoidance through slot (101) is formed in a middle portion of the first detachable connection component;
    a camera component, on which a second detachable connection component (200) for fitting with the first detachable connection component (100) to establish a detachable connection is arranged;
    wherein the camera device comprises a shell (400) and a camera module (301) that is arranged inside the shell (400), and the shell (400) comprises a rear shell (420) and a front shell (410) that is in detachable connection with the rear shell (420);
    wherein a second avoidance slot (411) corresponding to the first avoidance through slot (101) is arranged on one end of the front shell (410), an assembly slot (412) is arranged on one end of the front shell (410), which end is distal from the rear shell (420), the camera module (301) has one end that is threaded through the first avoidance through slot (101) and the second avoidance slot (411), and a light-shielding sticker (500) is arranged in the assembly slot (412).

2. The detachable camera device according to claim 1, wherein the first detachable connection component (100) is a magnetic sticker, a bonding layer for bonding to the area where the camera is to be mounted is arranged on one end of the magnetic sticker, which end is distal from the shell (400), the second detachable connection component (200) is a magnetic block that is arranged on one end of the front shell (410), which end is proximal to the rear shell (420).

3. The detachable camera device according to claim 2, wherein four mounting holes (413) are uniformly arranged on one end of the front shell (410), which end is proximal to the rear shell (420), and the magnetic block is arranged in the mounting holes (413).

4. The detachable camera device according to claim 3, wherein at least two assembly connection columns (600) are arranged opposite to each other inside the shell (400), and limit slots (302) that fit with the assembly connection columns (600) to carry out limiting are arranged on a side wall of the camera module (301).

5. The detachable camera device according to claim 4, wherein countersunk through-holes (601) corresponding to the assembly connection columns (600) are arranged on the front shell (410), configured to be connected to the assembly connection columns (600) as connecting members pass through the countersunk through-holes (601).

6. The detachable camera device according to claim 1, wherein a snap-fit slot (700) is arranged on one side of the shell (400), and a snap-fit block for snap-fit connection with the snap-fit slot (700) is arranged on the camera module (301).

7. The detachable camera device according to claim 3, wherein sound holes (421) are arranged on one end of the rear shell (420), which end is distal from the front shell (410).

8. The detachable camera device according to claim 1, wherein any one or more of a battery (810), an indicator light (811), a microphone (812), and a speaker (813) are mounted inside the shell (400), and a charging cable (800) that is electrically connected to the camera module (301) is arranged on a bottom portion of the shell (400).

\* \* \* \* \*